(12) United States Patent
Iwamoto et al.

(10) Patent No.: US 11,926,388 B2
(45) Date of Patent: *Mar. 12, 2024

(54) LEANING VEHICLE

(71) Applicant: KAWASAKI MOTORS, LTD., Akashi (JP)

(72) Inventors: Taro Iwamoto, Akashi (JP); Takeshi Nakajima, Akashi (JP); Hiroshi Ishii, Akashi (JP); Kazuya Nagasaka, Akashi (JP); Taichi Inaba, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/757,956

(22) PCT Filed: Jun. 5, 2020

(86) PCT No.: PCT/JP2020/022275
§ 371 (c)(1),
(2) Date: Jun. 24, 2022

(87) PCT Pub. No.: WO2021/131101
PCT Pub. Date: Jul. 1, 2021

(65) Prior Publication Data
US 2023/0015938 A1 Jan. 19, 2023

(30) Foreign Application Priority Data
Dec. 26, 2019 (JP) .................................. 2019-236738

(51) Int. Cl.
*B62K 5/10* (2013.01)
*B62K 5/027* (2013.01)
(Continued)

(52) U.S. Cl.
CPC ................ *B62K 5/10* (2013.01); *B62K 5/027* (2013.01); *B62K 5/05* (2013.01); *B62K 5/08* (2013.01)

(58) Field of Classification Search
CPC . B62K 5/10; B62K 5/027; B62K 5/05; B62K 5/08; B62L 1/00
See application file for complete search history.

(56) References Cited

U.S. PATENT DOCUMENTS 8,070,017 B2 * 12/2011 Green .................... B65D 83/38
222/402.1
9,216,790 B2 * 12/2015 Takano .................... B62K 5/08

FOREIGN PATENT DOCUMENTS

CN 201670311 12/2010
CN 107600258 1/2018
(Continued)

*Primary Examiner* — Paul N Dickson
*Assistant Examiner* — Shams Dhanani
(74) *Attorney, Agent, or Firm* — Fay Kaplun & Marcin, LLP (57) ABSTRACT

A leaning vehicle includes a vehicle body, a left front wheel, a right front wheel, a lean mechanism, and a lean brake mechanism. The lean mechanism causes the left front wheel and the right front wheel to lean about a front-rear direction as a rotation center when the vehicle body leans about the front-rear direction as a rotation center. The lean brake mechanism brakes a leaning operation of the lean mechanism. The lean brake mechanism includes a brake caliper and a brake disc. The brake caliper is attached to the lean mechanism and has a brake pad. The brake disc is attached to the lower arm of the upper arm and the lower arm that is farther from the brake pad in the front view, has a contact portion that generates braking force by being pressed by the brake pad.

9 Claims, 9 Drawing Sheets

(51) Int. Cl.
*B62K 5/05* (2013.01)
*B62K 5/08* (2006.01)

(56) References Cited

FOREIGN PATENT DOCUMENTS

| | | |
|---|---|---|
| CN | 207360480 U | 5/2018 |
| ES | 1 086 231 | 7/2013 |
| JP | 2004122832 A | 4/2004 |
| JP | 2006160254 A | 6/2006 |
| JP | 2016175440 A | 10/2016 |
| JP | 2019500264 A | 1/2019 |
| JP | 2019503929 A | 2/2019 |
| KR | 10-2011-0115287 | 10/2011 |
| TW | M562251 | 6/2018 |
| WO | WO-2013104335 A1 * | 7/2013 ............. B62K 25/24 |
| WO | 2019/060966 A1 | 4/2019 |

* cited by examiner

Fig. 8 comparative example

Fig. 9

LEANING VEHICLE

PRIORITY DATA

The present application is a 371 application of PCT patent application Ser. No. PCT/JP2020/022275 filed on Jun. 5, 2020 which claims priority to Japanese Patent Application Serial No. 2019-236738 filed on Dec. 26, 2019. The disclosure of the above applications is incorporated herein by reference.

TECHNICAL FIELD

The present invention relates mainly to a leaning vehicle configured to lean a vehicle body when turning, for example.

BACKGROUND ART

Patent Literature 1 (PTL 1) discloses a rolling three-wheeled vehicle including two front wheels and one rear wheel. The rolling three-wheeled vehicle includes an anti-roll device to prevent rolling of the vehicle when the front wheels are replaced, for example. The anti-roll device includes a stop member and a fixing member. The stop member moves integrally with a member for rolling the vehicle. The fixing member fixes the stop member to a frame when replacing the front wheels. Accordingly, a replacement operation of the front wheels can be done during one of front wheels is lifted.

CITATION LIST

Patent Literature

PTL 1: Japanese Patent Application Laid-Open No. 2006-160254

SUMMARY OF INVENTION

PTL 1 does not disclose a detailed configuration of the fixing member. In other words, PTL 1 does not disclose a force that the anti-roll device prevents rolling (leaning operation) and a size of the anti-roll device.

The present invention relates to a leaning vehicle having a lean brake mechanism which has a large braking force and is a compact configuration.

Solution to Problem

The problem to be solved by the present invention is as above. The following describes solutions to the problem as well as advantageous effects thereof.

An aspect of the present invention provides a leaning vehicle having the following configuration. The leaning vehicle includes a vehicle body, a first front wheel, a second front wheel, a lean mechanism, and a lean brake mechanism. The first front wheel is positioned on a first side in a vehicle width direction. The second front wheel is positioned on a second side opposite to the first side in the vehicle width direction. The lean mechanism causes the first front wheel and the second front wheel to lean about a front-rear direction as a rotation center when the vehicle body leans about the front-rear direction as a rotation center. The lean brake mechanism brakes a leaning operation of the lean mechanism. The lean mechanism includes an upper arm, a lower arm, a first arm, a second arm, and a lean base. The lower arm is positioned more downward than the upper arm. The first arm is attached to the first front wheel, and is rotatably attached to the upper and lower arms. The second arm is attached to the second front wheel, and is rotatably attached to the upper and lower arms. The lean base connects the upper arm and the lower arm to the vehicle body. The lean brake mechanism includes a brake caliper and a brake disc. The brake caliper is attached to the lean mechanism and has a brake pad. The brake disc is attached to one arm of the upper arm and the lower arm that is farther from the brake pad in a front view, has a contact portion that generates braking force by being pressed by the brake pad.

Accordingly, by attaching the brake disc to one arm that is farther from the brake pad, a rotation radius is large and thus the braking force can be large. As the lean brake mechanism is attached to the lean mechanism, the lean brake mechanism can be compact. The above allows for a compact configuration while increasing the braking force of the lean brake.

Advantageous Effects of Invention

According to the present invention, one of the advantages is a leaning vehicle having a lean brake mechanism which has a large braking force and is a compact configuration can be provided.

DETAILED DESCRIPTION

Hereinafter, embodiments of the present invention will be described with reference to the drawings. In the description below, a left-right direction of a leaning vehicle 1 is defined based on a direction in which a driver riding on the leaning vehicle 1 faces. While the leaning vehicle 1 is upright, therefore, a front-rear direction is coincident with a vehicle length direction, and the left-right direction is coincident with a vehicle width direction. An up-down direction or an upper-lower direction (vertical direction) is coincident with a height direction.

In the description below, the wording of A being attached to (supported by) B should be interpreted as showing not only a configuration in which A is directly attached to (supported by) B but also a configuration in which A is attached to (supported by) B with interposition of another member. The wording of A overlapping the center in the vehicle width direction means that an imaginary line passing through the center of the leaning vehicle in the vehicle width direction overlaps A in a plan view or a front view, for example. The term "front portion" means a frontmost portion from among two or three portions into which the whole is divided in the front-rear direction (the same applies to a rear portion, etc.). Any description about the position of a member is based on a state where the leaning vehicle 1 is upright, a state where a steering angle is neutral, and a state where no load is applied except the dead load.

Figure 1:
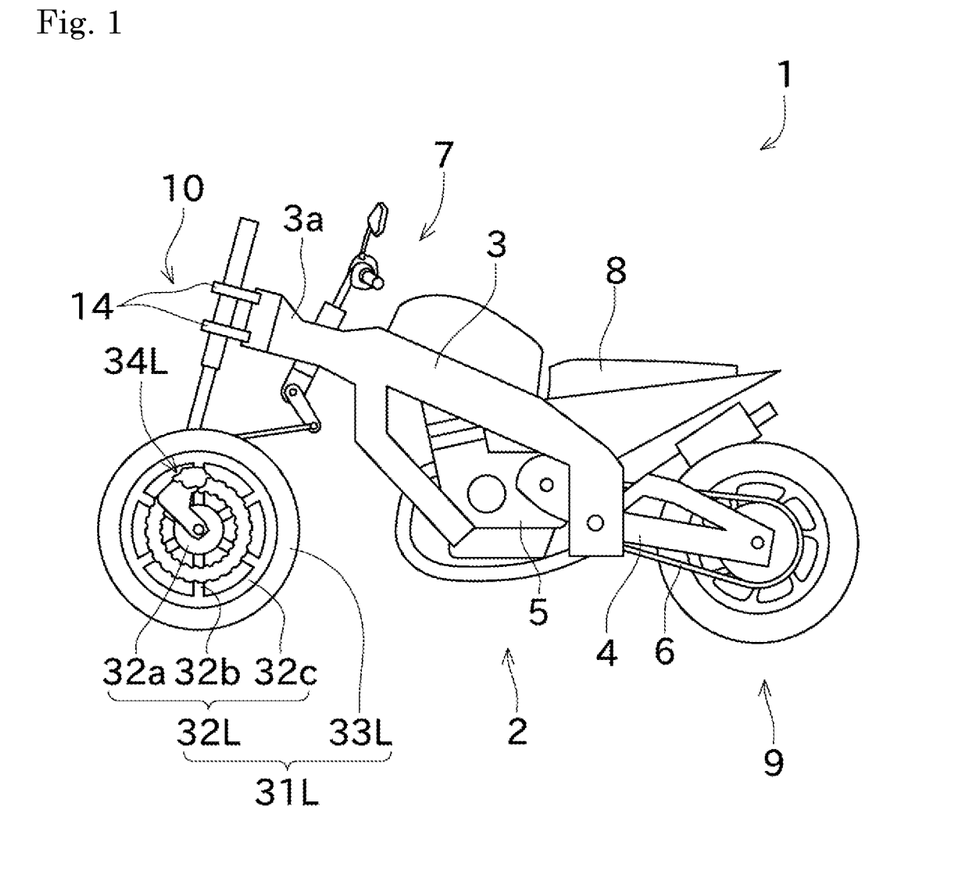
FIG. 1 shows a side view of a leaning vehicle according to one embodiment of the present invention.

First, referring to FIG. 1 and FIG. 2, outline of the leaning vehicle 1 will be described.

The leaning vehicle 1 includes a vehicle body 2, a left front wheel (first front wheel) 31L, a right front wheel (second front wheel) 31R, and a rear wheel 9. The vehicle body 2 includes a vehicle body frame 3, which constitutes a framework of the leaning vehicle 1. The vehicle body frame 3 is composed of two or more frame elements coupled with a bolt or by welding, for example.

The left front wheel 31L is disposed on the left side (first side) relative to the center in the vehicle width direction. The right front wheel 31R is disposed on the right side (second side) relative to the center in the vehicle width direction. The left front wheel 31L and the right front wheel 31R are attached to the vehicle body frame 3.

The rear wheel 9 is disposed at the center in the vehicle width direction. A swing arm 4 attached to a rear portion of the vehicle body frame 3 is capable of swinging up and down relative to the vehicle body frame 3. The rear wheel 9 is attached to the swing arm 4.

An engine 5 is attached to the vehicle body frame 3. The engine 5 is a drive source for making the leaning vehicle 1 travel. Power generated by the engine 5 is transmitted to the rear wheel 9 via a drive chain 6. In this manner, the leaning vehicle 1 can be made travel. Instead of or in addition to the engine 5, another drive source such as an electric motor for traveling may be provided. Alternatively, the engine 5 may be replaced with, for example, a pedal that allows the driver to apply power for traveling.

Attached to the vehicle body frame 3 is a steering handle 7 in the shape of a handlebar. In response to the driver applying a rotational steering force to the steering handle 7, the rotational steering force is transmitted to the left front wheel 31L and the right front wheel 31R via a later-described mechanism and a steering rod 26. This can consequently change an advancing direction of the leaning vehicle 1. Hereinafter, a change of the advancing direction of the leaning vehicle 1 may sometimes be referred to as a turn of the leaning vehicle 1. The later-described lean mechanism causes the leaning vehicle 1, when turning, to lean toward the center of the turning relative to a road surface. The steering handle 7 is not limited to a handlebar type one, and may be a steering wheel.

A seat 8 for the driver to sit thereon is disposed rearward of the steering handle 7. Steps (not shown) are disposed on a left side surface and a right side surface of the vehicle body 2, respectively. The driver straddling the seat 8 places his/her feet on the left and right steps. The leaning vehicle 1 is a vehicle (straddle vehicle) of a type having the seat 8 on which the driver sits astride.

Figure 2:
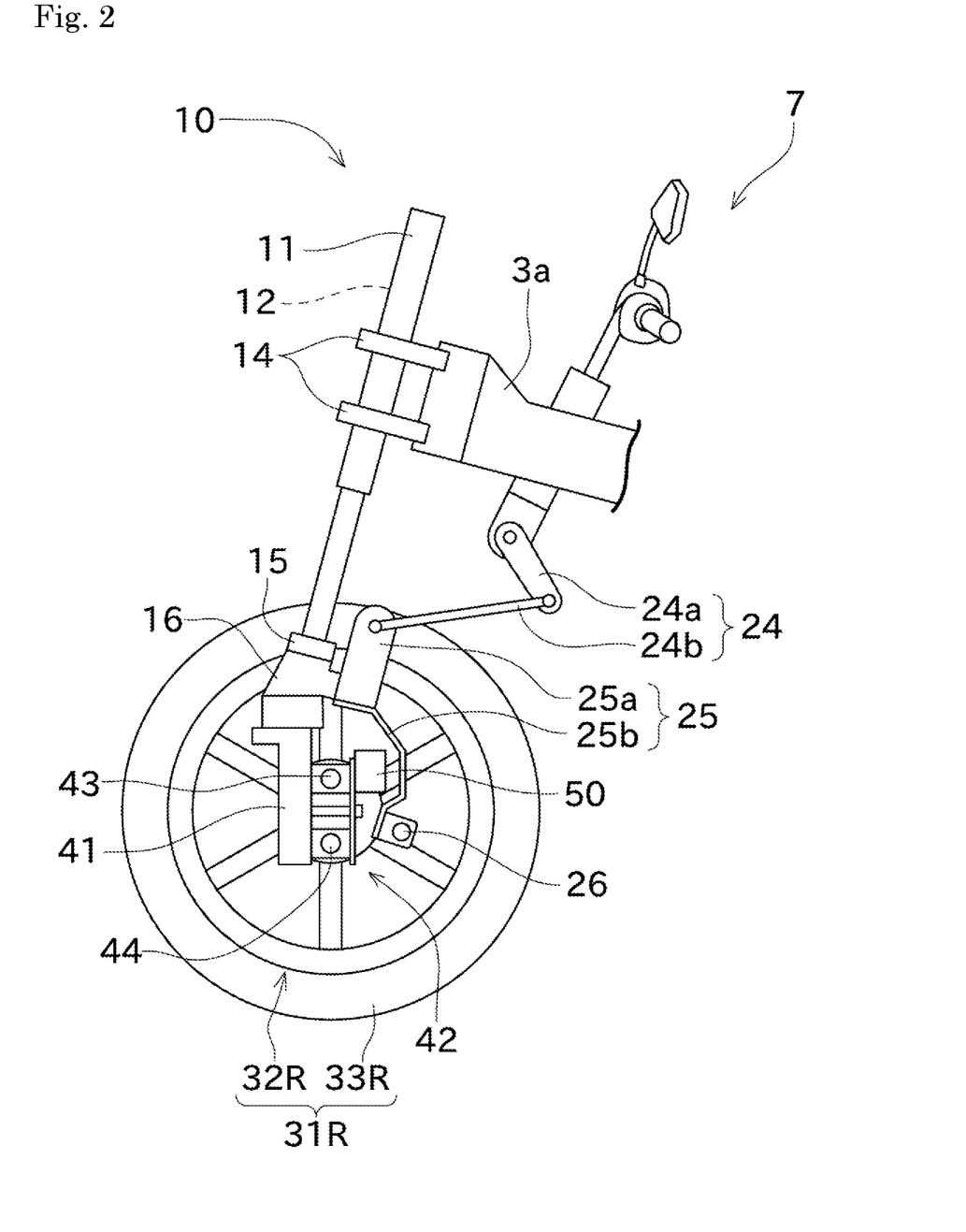
FIG. 2 shows a side view of a front portion of the leaning vehicle.

As shown in FIG. 2, a suspension 10 is disposed at a front portion of the leaning vehicle 1. The suspension 10 couples the vehicle body 2 and the left front wheel 31L, and couples the vehicle body 2 and the right front wheel 31R. The suspension 10 reduces vibrations that are transmitted to the vehicle body 2 in order that vibrations of the left front wheel 31L and the right front wheel 31R caused by, for example, unevenness of the road surface cannot be directly transmitted to the vehicle body 2. The suspension 10 includes a first tubular suspension 11 and a second tubular suspension 12. The first tubular suspension 11 and the second tubular suspension 12 are disposed side by side in the left-right direction and are coupled each other. The configurations of the first tubular suspension 11 and the second tubular suspension 12 are identical to the configuration of a front fork that is generally adopted in a motorcycle. In other words, the first tubular suspension 11 and the second tubular suspension 12 have an outer tube, an inner tube, and a spring that connects them. The suspension 10 is not limited to a front fork type.

The outer tube of the first tubular suspension 11 and the outer tube of the second tubular suspension 12 are coupled by an upper coupling member 14. The upper coupling member 14 is attached to a front frame that is positioned at the front portion of the vehicle body frame 3. The inner tube of the first tubular suspension 11 and the inner tube of the second tubular suspension 12 are coupled by a lower coupling member 15 (FIG. 2). The lower coupling member 15 is attached to a lower coupling base. The left front wheel 31L and the right front wheel 31R are attached to the lower coupling base 16 via the later-described mechanism.

The left front wheel 31L and the right front wheel 31R are bilaterally symmetrical with respect to the center in the vehicle width direction. In the following, therefore, only the left front wheel 31L will be described, and a description about the right front wheel 31R (a right wheel 32R and a right tire 33R), a right brake, and the like, will be omitted.

The left front wheel 31L includes a left wheel 32L and a left tire 33L. A left brake (front wheel brake mechanism) 34L is attached more outward than the left wheel 32L in the vehicle width direction. The left brake 34L applies braking to the left front wheel 31L by inserting a brake disc for the front wheel, which is attached to the left wheel 32L, into a brake caliper for the front wheel. It may be also acceptable that the left brake 34L is attached more inward than the left wheel 32L in the vehicle width direction.

The left wheel 32L includes a hub 32a, a spoke 32b, and a rim 32c. The hub 32a has a hub hole in which an axle is received. The spoke 32b is shaped to extend outward from the hub 32a in a radial manner. The rim 32c is connected to the radially outer side of the spoke 32b, and the left tire 33L is attached to the rim 32c.

Figure 3:
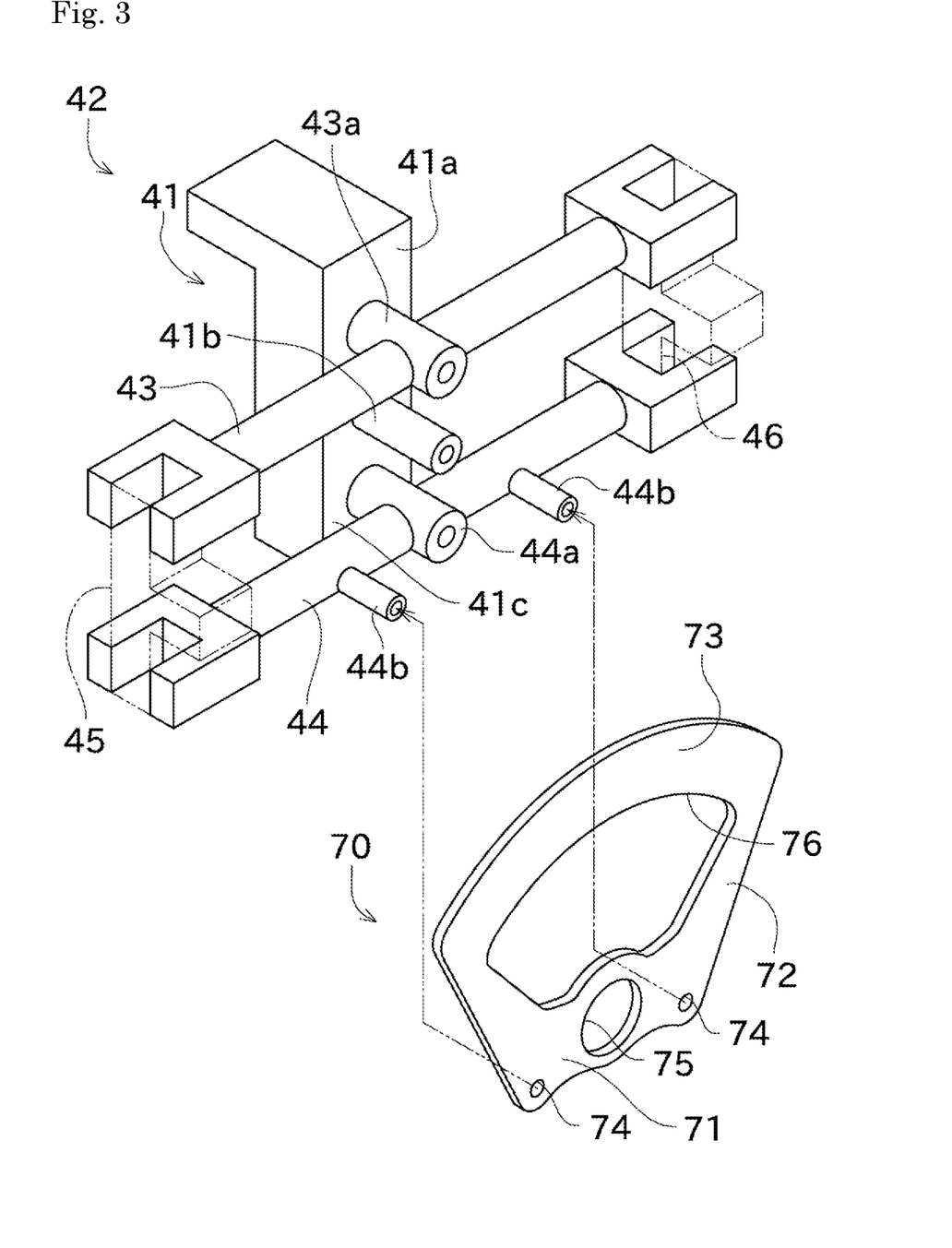
FIG. 3 shows a back-side perspective view illustrating a brake disc being attached to a lean
Figure 9:
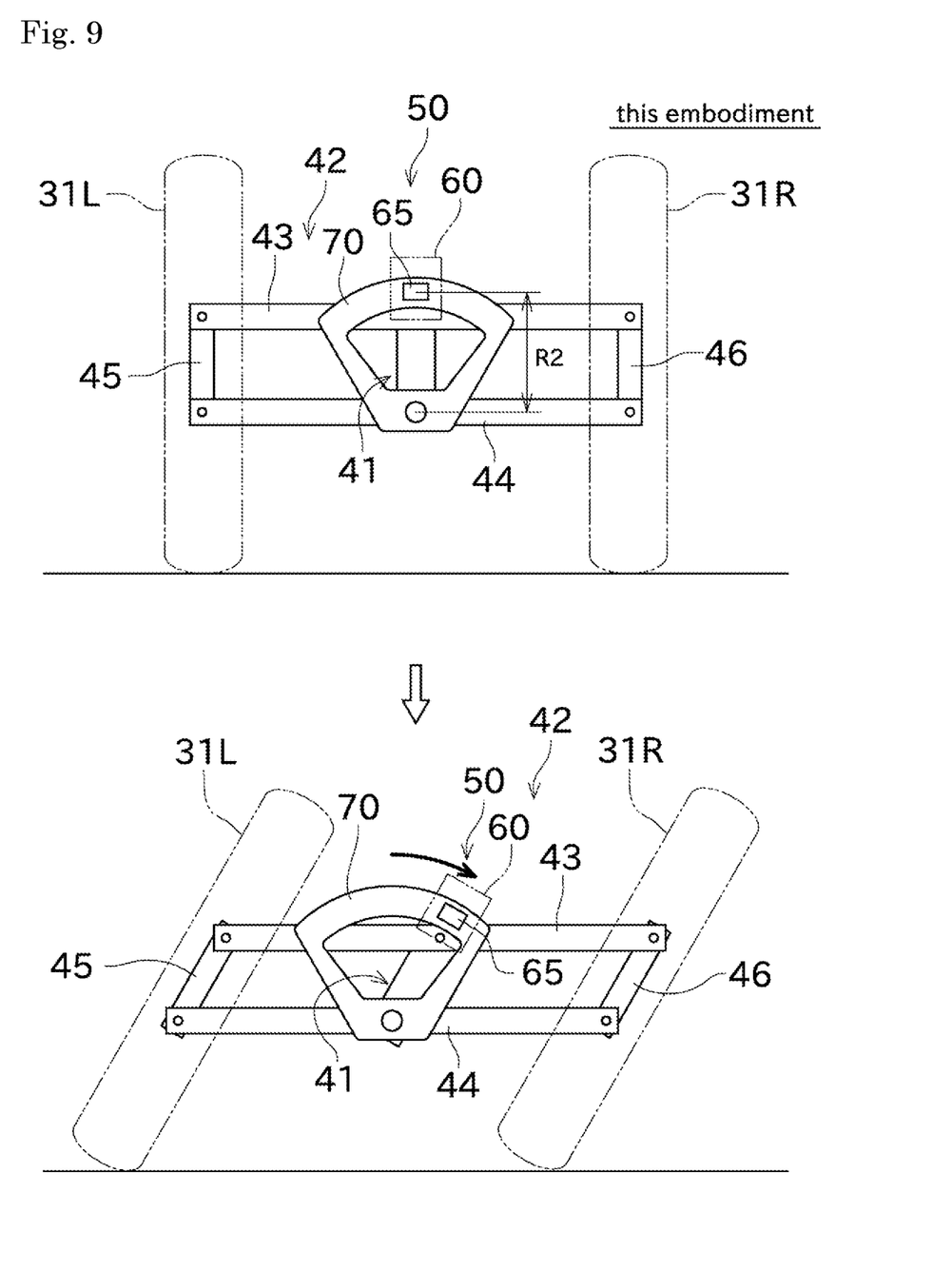
FIG. 9 shows a schematic front view illustrating a leaning operation and a leaning brake operation of this embodiment.

Attached to an inner side in the vehicle width direction of the left wheel 32L is a left arm 45 as a left knuckle member (FIG. 3, FIG. 9). An outer end portion of the above-mentioned steering rod 26 in the vehicle width direction is rotatably attached to the left arm 45. Specifically, the left arm 45 has a portion extending upward/downward and a portion extending rearward, and the steering rod 26 is attached to the portion extending rearward. The steering rod 26 transmits a steering force to the left front wheel 31L via the left arm 45. The left arm 45 also constitutes a part of a lean mechanism which will be described later. That is, the left arm 45 of this embodiment is a part in which a knuckle member for changing an actual steering angle and a member for leaning the leaning vehicle 1 are unified. The left arm may have a portion extending not rearward but forward, and the steering rod 26 may be attached to the portion extending forward.

Disposed below the steering handle 7, as shown in FIG. 2, is a pantograph mechanism 24. The pantograph mechanism 24 is positioned so as to overlap the center in the vehicle width direction. The pantograph mechanism 24 includes a first link portion 24a and a second link portion 24b. The first link portion 24a is attached to the steering handle 7 so as to be rotatable about the vehicle width direction. The second link portion 24b is attached to a later-described auxiliary steering part 25 so as to be rotatable about the vehicle width direction. The first link portion 24a and the second link portion 24b are coupled to each other so as to be rotatable about the vehicle width direction.

With the configuration described above, the steering handle 7 of the vehicle body 2 side and the auxiliary steering part 25 moving upward and downward according to an unevenness of a road surface can be kept coupled even if a relative distance between the steering handle 7 and the auxiliary steering part 25 is changed. Accordingly, transmission of the rotational steering force remains enabled even though the suspension 10 expands or contracts because of, for example, unevenness of the road surface.

In this embodiment, the rotation axis of the steering handle 7 and the rotation axis of the pantograph mechanism 24 are same, but may be different. Other parts for relaying the connection of the steering handle 7 and the pantograph mechanism 24 may be provided.

The auxiliary steering part 25 is positioned so as to overlap the center in the vehicle width direction. The auxiliary steering part 25 transmits a rotational steering force received via the pantograph mechanism 24 to the steering rod 26. The auxiliary steering part 25 includes a suspension attaching portion 25a and a rod attaching portion 25b.

The suspension attaching portion 25a is attached to the pantograph mechanism 24 (more specifically, to the second link portion 24b). The suspension attaching portion 25a is attached to the lower coupling base 16, too. The auxiliary steering part 25 rotates in accordance with steering, while the lower coupling base 16 does not rotate in accordance with steering. Accordingly, the auxiliary steering part 25 is attached so as to be rotatable relative to the lower coupling base 16.

The rod attaching portion 25b is attached to a lower portion of the suspension attaching portion 25a. The rod attaching portion 25b has a portion that extends rearward from the suspension attaching portion 25a and a portion that extends downward. With this configuration, a space can be formed below the suspension attaching portion 25a. In this space, a part of the later-described lean mechanism is disposed. If the steering rod 26 is disposed at forward of the axle, it is preferable that the rod attaching portion 25b has a portion that extends forward from the suspension attaching portion 25a and a portion that extends downward.

The steering rod 26 is rotatably attached to the rod attaching portion 25b. The longitudinal direction of the steering rod 26 is coincident with the vehicle width direction. The left end of the steering rod 26 is attached to the left front wheel 31L (more specifically, to a portion of the left front wheel 31L more rearward than the axle). The right end of the steering rod 26 is attached to the right front wheel 31R (more specifically, to a portion of the right front wheel 31R more rearward than the axle). A rotational steering force applied by the driver causes the rod attaching portion 25b to rotate about a predetermined rotation axis, so that the steering rod 26 moves left or right. As a result, the actual steering angle is changed. The actual steering angle is a direction of the left front wheel 31L and the right front wheel 31R (more specifically, a rotation angle about a substantially upper-lower direction). This is how the advancing direction of the leaning vehicle 1 can be changed in accordance with the driver's manipulation.

A lean mechanism 42 will now be described with reference mainly to FIG. 3.

In the description of the lean mechanism 42, being rotatably attached means being attached so as to be capable of relative rotation about the front-rear direction.

The lean base 41 is attached to lower side of the lower coupling base 16. The lean base 41 is a member for supporting the lean mechanism 42 and also for coupling the lean mechanism 42 to the vehicle body 2 side (vehicle body frame 3 side). The lean base 41 is positioned so as to overlap the center in the vehicle width direction.

The lean base 41 includes an upper attaching portion 41a and a lower attaching portion 41c. The upper attaching portion 41a and the lower attaching portion 41c are formed on surfaces on the rear side (one side in the front-rear direction, hereinafter the same). The upper attaching portion 41a and the lower attaching portion 41c may be formed on a front surface of the lean base 41. The upper attaching portion 41a and a lower attaching portion 41c are at the same position in the front-rear direction in this embodiment, but may be different.

The lean mechanism 42 includes an upper arm 43, a lower arm 44, a left arm (first arm) 45, and a right arm (second arm) 46. The upper arm 43 is disposed more upward than the lower arm 44. The left arm 45 is rotatably coupled to the left end of the upper arm 43 and to the left end of the lower arm 44. The right arm 46 is rotatably coupled to the right end of the upper arm 43 and to the right end of the lower arm 44. The lean mechanism 42 is positioned so as to overlap the center in the vehicle width direction, and the left arm 45 and the right arm 46 are bilaterally symmetrical with respect to the center in the vehicle width direction.

The left end of the upper arm 43 has a bifurcated attaching portion. The upper arm 43 is attached to the left arm 45 in such a manner that the bifurcated attaching portion pinches an upper portion of the left arm 45 in the front-rear direction. This allows the left front wheel 31L to lean appropriately. The right end of the upper arm 43, and the left and right ends of the lower arm 44 also have bifurcated attaching portions in the same manner.

The upper arm 43 has, at its longitudinal center, an upper fulcrum portion 43a. The upper fulcrum portion 43a is a tubular portion whose axial direction is coincident with the front-rear direction. The upper fulcrum portion 43a is rotatably attached to the upper attaching portion 41a.

The lower arm 44 is attached in the same manner as the upper arm 43 is. To be specific, the lower arm 44 has, at its longitudinal center, a lower fulcrum portion 44a. The lower fulcrum portion 44a is a tubular portion whose axial direction is coincident with the front-rear direction. The lower fulcrum portion 44a is rotatably attached to the lower attaching portion 41c.

In an area between the upper attaching portion 41a and the lower attaching portion 41c, a middle protruding tube 41b is formed. The middle protruding tube 41b is a part of the lean base 41 and is integrally formed the lean base 41. The middle protruding tube 41b is a tubular portion extending rearward and the axial direction of the middle protruding tube 41b is coincident with the front-rear direction. As described later, the middle protruding tube 41b is coupled to an upper fulcrum portion 43a and a lower fulcrum portion 44a.

The left arm 45 is rotatably attached to the left wheel 32L. To be specific, the left arm 45 is attached to the hub 32a of the left wheel 32L via an axis member that is not shown (the axle of the left wheel 32L, for example). The left arm 45 is fixed to the left wheel 32L such that the left arm 45 leans integrally with the left wheel 32L. Likewise, the right arm 46 is fixed to the hub 32a of the right wheel 32R.

The four arms constitute a parallel link. Accordingly, even in the leaning operation, the upper arm 43 and the lower arm 44 are kept parallel as shown in FIG. 9 that is described later. The upper arm 43 rotates about the upper fulcrum portion 43a relative to the lean base 41. Likewise, the lower arm 44 rotates about the lower fulcrum portion 44a relative to the lean base 41. This is how the lean mechanism 42 rotates relative to the lean base 41.

Since the four arms constitute the parallel link, the left arm 45 and the right arm 46 are kept parallel even in the leaning operation. It therefore is possible that the left front wheel 31L and the right front wheel 31R lean with the same lean angle. The lean angle means the angle formed between a vehicle height direction of the leaning vehicle 1 and a direction perpendicular to the road surface.

The lean base 41 couples the longitudinal center (upper fulcrum portion 43a) of the upper arm 43 to the longitudinal center (lower fulcrum portion 44a) of the lower arm 44. Accordingly, the lean base 41 leans with the same lean angle as the left front wheel 31L and the right front wheel 31R do. In other words, the vehicle body 2 leans with the same lean angle as the left front wheel 31L and the right front wheel 31R do. The rear wheel 9 leans integrally with the vehicle body 2. In this manner, the leaning vehicle 1 is configured to be capable of leaning.

The lean brake mechanism 50 will now be described with reference to FIG. 3 to FIG. 7.

As described above, in the leaning operation, the relative position of the lean base 41 and the upper arm 43 changes and the relative position of the lean base 41 and the lower arm 44 changes. Taking advantage of that, the lean brake mechanism 50 actuates the lean brake. The lean brake means generating a resistance force on the leaning operation to make the leaning operation less likely to occur or to reduce the lean angle. The lean brake mechanism 50 includes a brake caliper 60 and a brake disc 70. The brake caliper 60 is attached to the lean mechanism 42 by the lean bracket 80.

Figure 4:
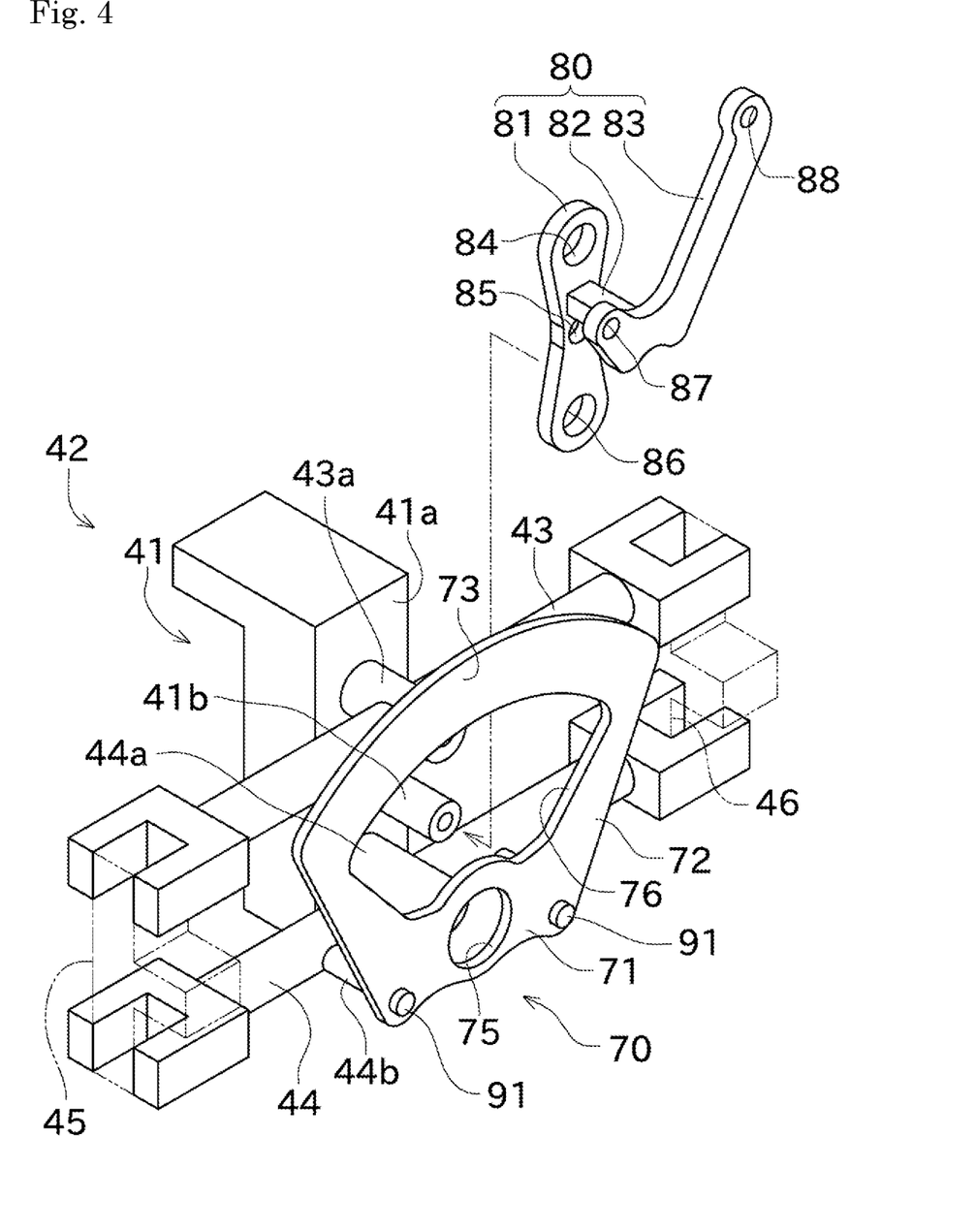
FIG. 4 shows a back-side perspective view illustrating a lean bracket being attached to the lean mechanism.

The lean bracket 80 includes a base attaching portion 81, a relay portion 82, and a caliper attaching portion 83. The lean bracket 80 is integrally formed by using a mold. Thus, the base attaching portion 81, the relay portion 82, and the caliper attaching portion 83 are integrally configured and they cannot be separated.

The base attaching portion 81 is plate-shaped and disposed so that a thickness direction coincides with the front-rear direction. In order from the top to the bottom, attaching holes 84, 85, 86 are formed on the base attaching portion 81. After aligning the attaching hole 84 with the upper fulcrum portion 43a, the lean bracket 80 is attached to the upper arm 43 by inserting a fixture 92. Similarly, after aligning the attaching hole 85 with the middle protruding tube 41b, the lean bracket 80 is attached to the lean base 41 by inserting a fixture 93. Similarly, after aligning the attaching hole 86 with the lower fulcrum portion 44a, the lean bracket 80 is attached to the lower arm 44 by inserting a fixture 94.

In this matter, the lean bracket 80 couples the upper fulcrum portion 43a to the middle protruding tube 41b and lower fulcrum portion 44a to the middle protruding tube 41b. As a result, the upper arm 43 and the lower arm 44 can be supported in a manner of being sandwiched between the lean base 41 and the lean bracket 80 in the front-rear direction, so that the upper arm 43 and the lower arm 44 can be supported more stably as compared to cantilevered supporting.

The relay portion 82 is a portion that extends rearward from the base attaching portion 81 (away from the lean base 41). The relay portion 82 is a portion for separating the base attaching portion 81 and the caliper attaching portion 83 in the front-rear direction.

Figure 7:
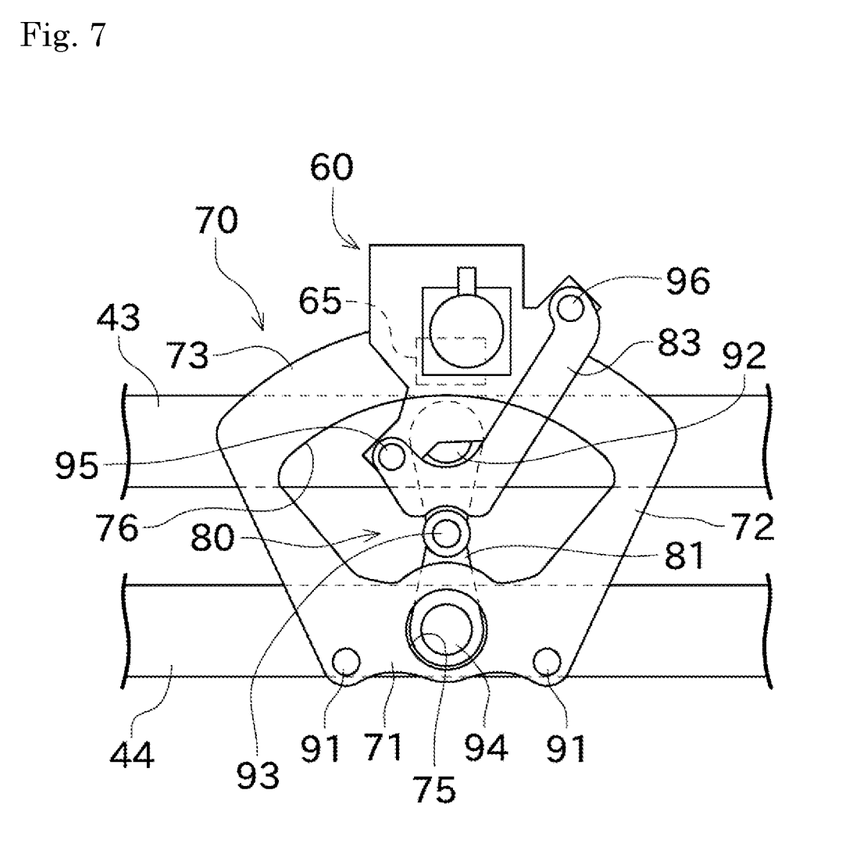
FIG. 7 shows a rear view of the lean mechanism and the lean brake mechanism.

The caliper attaching portion 83 is plate-shaped and arm-shaped, and disposed so that a thickness direction coincides with the front-rear direction. The caliper attaching portion 83 has a first attaching portion 87 and a second attaching portion 88. The first attaching portion 87 is formed near the middle protruding tube 41b in the rear view (FIG. 7). The second attaching portion 88 is formed higher than the first attaching portion 87. The brake caliper 60 is attached to the first attaching portion 87 and the second attaching portion 88.

This is how the lean bracket 80 has a function of coupling the upper fulcrum portion 43a and middle protruding tube 41b, a function of coupling the lower fulcrum portion 44a and the middle protruding tube 41b, and a function of attaching the brake caliper 60 to the lean mechanism 42.

Figure 5:
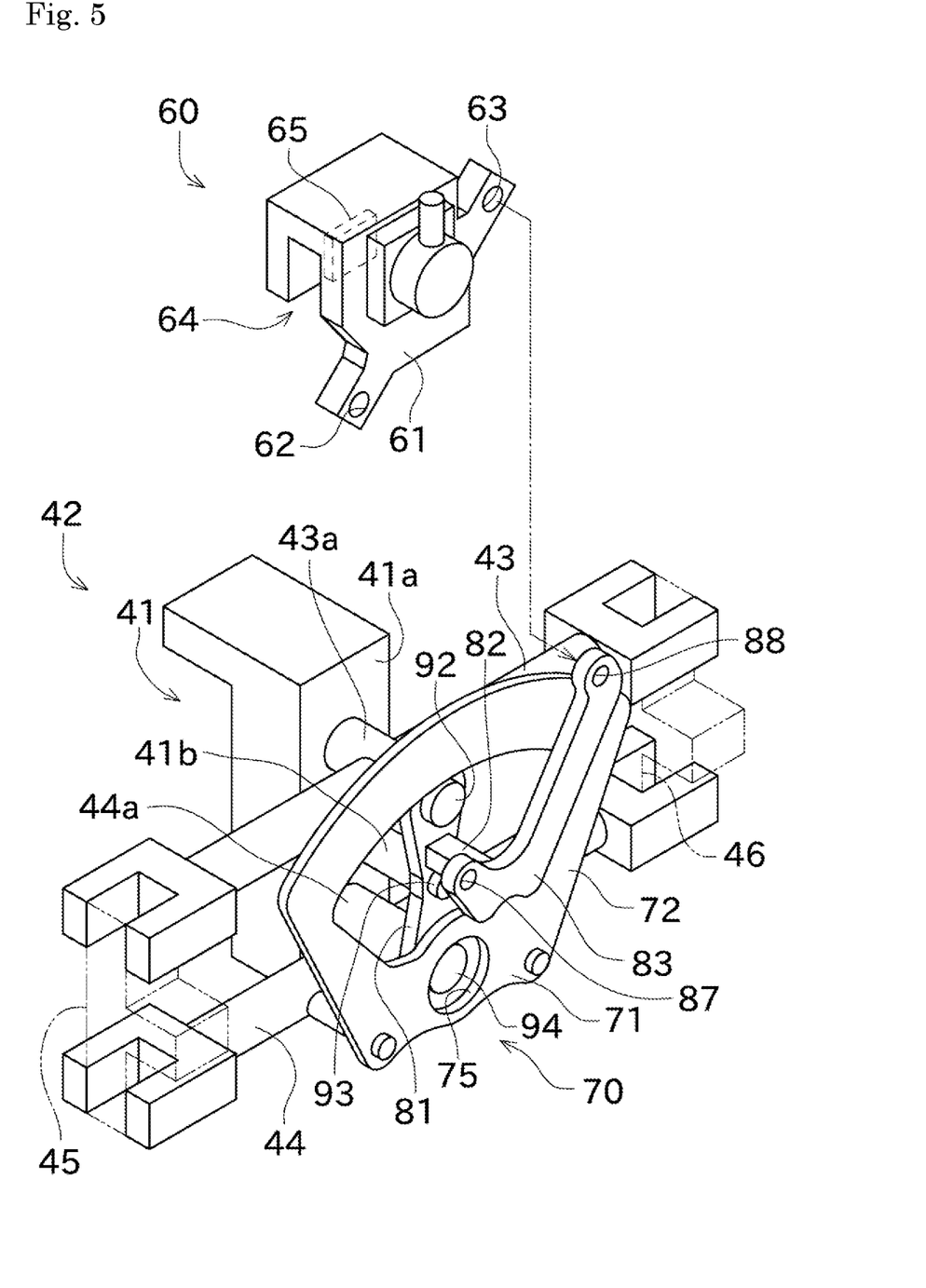
FIG. 5 shows a back-side perspective view illustrating a brake caliper being attached to the lean mechanism.

The brake caliper 60 has a body 61, a clamp portion 64, and a brake pad 65. Attaching holes 62, 63 are formed on the body 61. The attaching hole 62, 63 are part for attaching the brake caliper 60 to the lean mechanism 42. Specifically, after aligning the attaching hole 62 and the first attaching portion 87, a fixture 95 is inserted, and after aligning the attaching hole 63 and the second attaching portion 88, a fixture 96 is inserted. Thus, the brake caliper 60 is attached to the lean bracket 80. In this matter, the brake caliper 60 is attached to the lean mechanism 42.

In order to attach the brake caliper 60 to the lean bracket 80, there is a distance between the first attaching portion 87 and the second attaching portion 88. Specifically, the first attaching portion 87 is positioned at left of a center in the left-right direction (one side of left and right) of brake caliper 60 in the rear view and lower of a center in the upper-lower direction (one side of upper and lower) of brake caliper 60 in the rear view. In contrast, the second attaching portion 88 is positioned at right of a center in the left-right direction (one side of left and right) of brake caliper 60 in the rear view and upper of a center in the upper-lower direction (one side of upper and lower) of brake caliper 60 in the rear view. Thus, since the first attaching portion 87 and the second attaching portion 88 can be separated in two directions, the brake caliper 60 can be stably attached to the lean bracket 80.

The clamp portion 64 is U-shaped (groove-shaped) and has two walls facing each other. The brake pads 52b are stuck to respective walls. The two walls of the clamp portion 64 are configured to be approach and separated. Specifically, connected to the brake caliper 60 is a brake hose. As the driver manipulates a lean brake manipulator that is not shown mounted on the steering handle 7 and the like, a hydraulic fluid is supplied to the brake caliper 60. By supplying the hydraulic fluid, the two walls are approached by hydraulic forces. The lean brake mechanism 50 may be of an electric-powered type or a wire type, instead of a hydraulic type. Instead of the configuration of instructing the lean brake by the driver, the control device that is not shown may automatically operate the lean brake when the control device determines a predetermined conditions are met.

The brake pad 65 of this embodiment overlaps the upper arm 43 in the rear view or positioned at upper side of the upper arm 43. That is, the brake pad 65 is disposed closer to the upper arm 43 among the upper arm 43 and the lower arm 44.

The brake disc 70 is plate-shaped and fan-shaped. The brake disc 70 has a support portion 71, a connection portion 72, and a contact portion 73.

The support portion 71 is a portion for attaching the brake disc 70 to the lower arm 44. Specifically, two attaching hole 74 for inserting a fixture are formed on the support portion 71. On the other hand, two tubular disc attaching portions 44b, to which fixtures can be fastened, are connected to the lower arm 44 by welding, etc. The two disc attaching portions 44b are bilaterally symmetrical with respect to the center in the vehicle width direction. The axial centers of two discs attaching portion 44b is lower than an axial center of lower fulcrum portion 44a. By aligning the attaching hole 74 and the disc attaching portion 44b and inserting the fixture 91, the brake disc 70 is attached to the lower arm 44. Since they are fixed in this manner, the brake disc 70 is integrally moved with the lower arm 44. After the attachment to the lower arm 44, the connection portion 72 and the contact portion 73 are supported by the lower arm 44 via the support portion 71.

The connection portions 72 are a two elongated portions. The connection portions 72 connect the end of the support portion 71 in the left-right direction and the end of the contact portion 73 in the left-right direction. The length of the support portion 71 in the left-right direction is shorter than the length of the contact portion 73 in the left-right direction. Thus, the distance between the two connection portions 72 increases as they approach upward.

Figure 6:
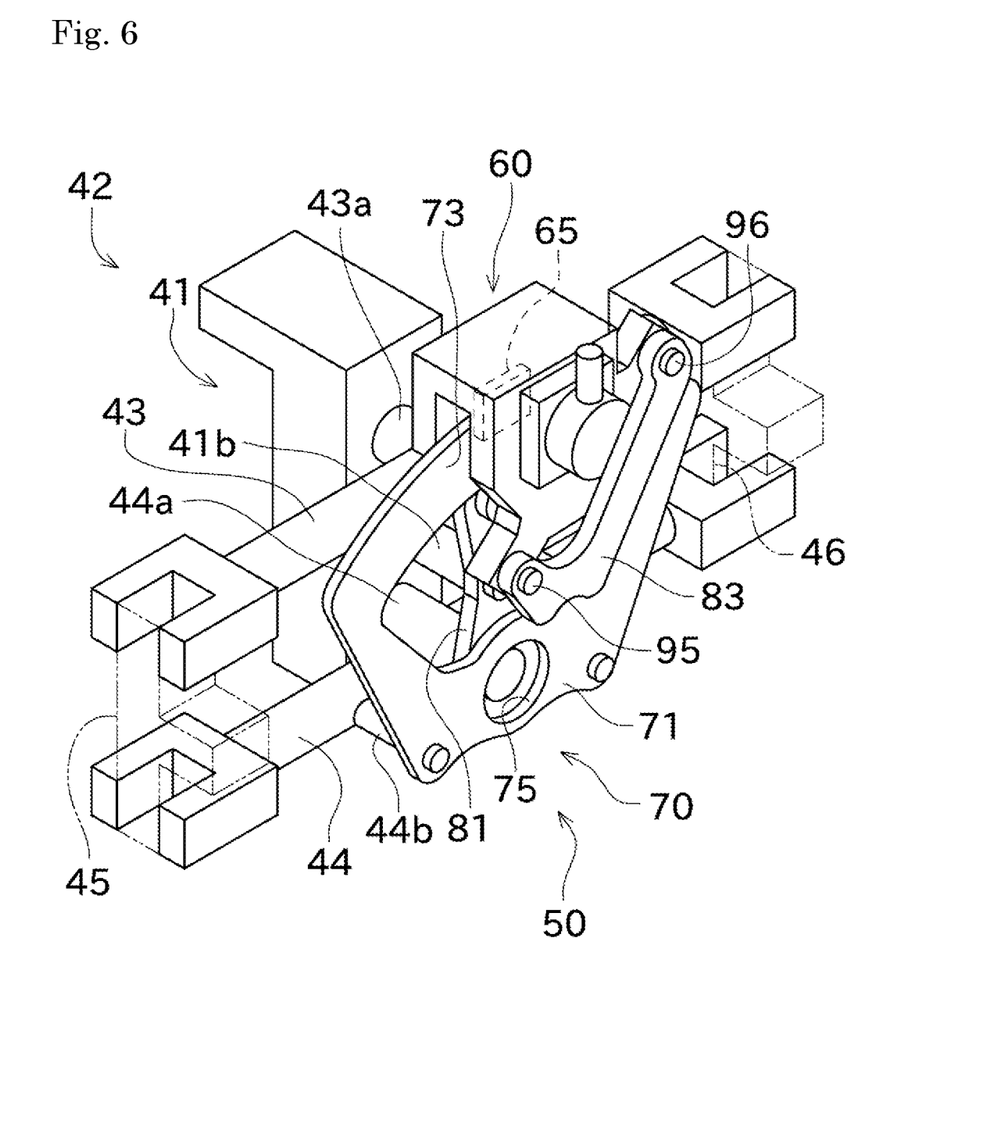
FIG. 6 shows a back-side perspective view of the lean mechanism and the lean brake mechanism.

The contact portion 73 is arc-shaped. The contact portion 73 is disposed near the brake caliper 60. Specifically, a part of the contact portion 73 is positioned at inside the clamp portion 64 (a space in which the two walls face each other). The brake disc 70, which is attached to the lower arm 44 against relative rotation, moves integrally with the lower arm 44. The lower arm 44 is capable of rotating relative to the lean base 41. Accordingly, in the leaning operation, the brake disc 70 rotates (about the lower fulcrum portion 44a) relative to the lean base 41.

The brake caliper 60, on the other hand, is attached at two points to the lean base 41 via the lean bracket 80. In the leaning operation, therefore, the brake caliper 60 does not rotate relative to the lean base 41.

In this embodiment, the brake caliper 60 and the brake disc 70 rotate relative to each other about the lower fulcrum portion 44a in the leaning operation. Thus, the frictional force generated by the brake pad 65 being pressed against the contact portion 73 serves as a braking force (a resistance force) of the leaning operation. In this manner, the lean brake mechanism 50 generates a braking force on the leaning operation.

Figure 8:
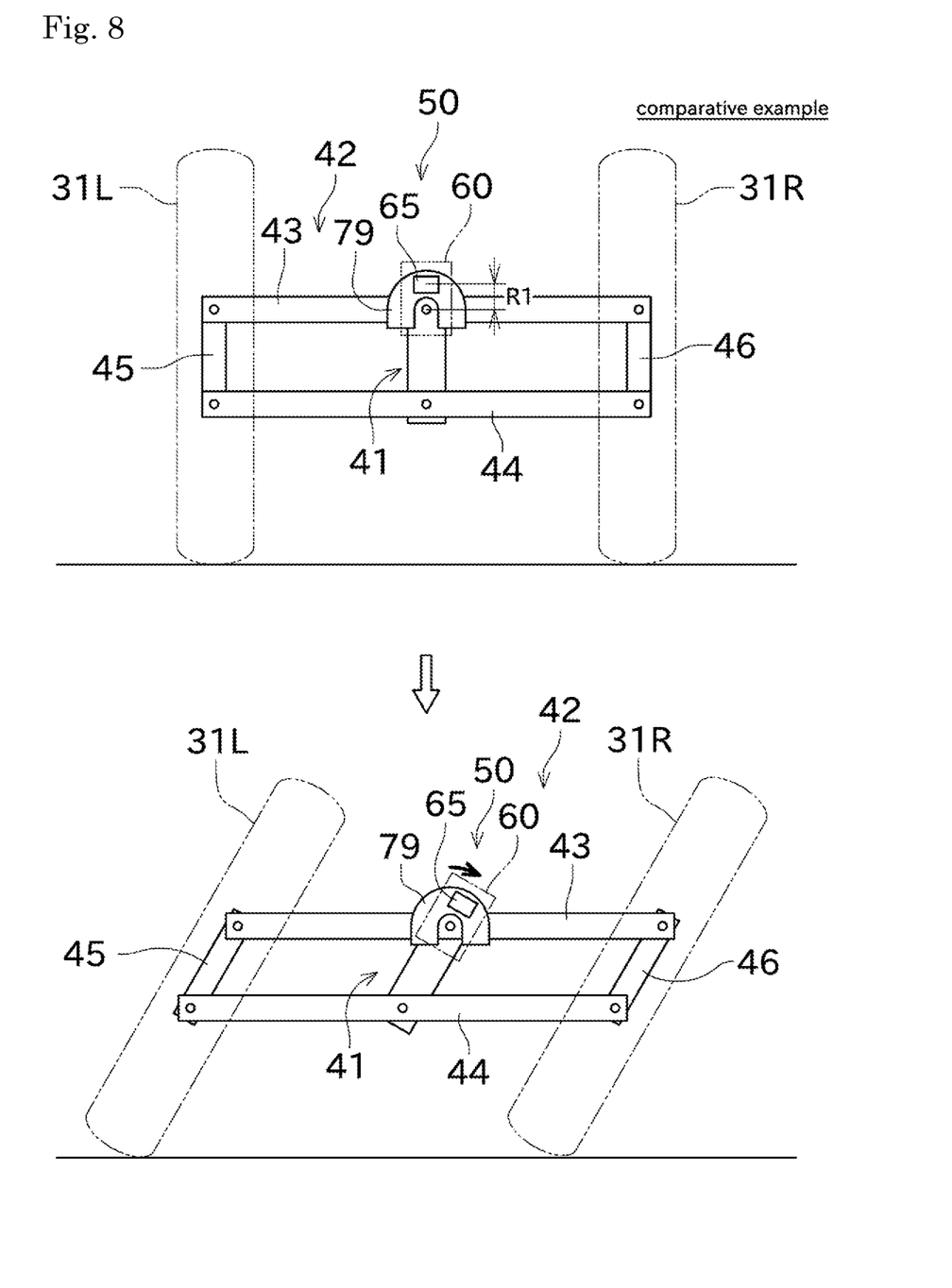
FIG. 8 shows a schematic front view illustrating a leaning operation and a leaning brake operation of comparative example.

The braking force of the lean brake mechanism 50 of this embodiment is larger than that of the lean brake mechanism 50 of the comparative example shown in FIG. 8. In the comparative example shown in FIG. 8, a position and size of the brake disc 79 is different from this embodiment. In the comparative example shown in FIG. 8, the brake disc 79 is attached to the upper arm 43. As a result, since a radius R1 of relative rotation of the brake pad 65 and the brake disc 79 is lower, the braking force tends to be lower. On the other hand, the brake disc 70 of this embodiment is attached to the lower arm 44 that is an arm farther from the brake caliper 60. Thus, since a radius R2 of relative rotation of the brake pad 65 and the brake disc 70 is longer, the braking force is larger.

In particular, in this embodiment, the contact portion 73 includes a part being positioned higher than the upper arm 43 (an arm closer to the brake pad 65) in the rear view. This allows for a long turning radius R2. On the other hand, the contact portion 73 also includes a portion overlapping the upper arm 43 in the rear view. This prevents the brake disc 70 from becoming too large. Thus, the lean brake mechanism 50 can be relatively compact and generate high braking force. The contact portion 73 consist of only an upper part of the upper arm 43 in the rear view.

The brake disc 70 may be attached not to the lower arm 44 but to the upper arm 43. When the brake disc 70 is attached to the upper arm 43, the brake disc 70 protrudes lower of the upper arm 43. The brake caliper 60 is mounted on near the lower arm 44. In this case, too, the brake disc 70 and the lower arm 44 overlap in the rear view, for example, and the brake disc 70 has a portion that is lower than the lower arm 44.

A first opening 75 and a second opening 76 are formed on the brake disc 70. The first opening 75 is circular-shaped and formed at near a position for attaching the brake disc 70 to the lower arm 44 (that is the support portion 71). The first opening 75 is formed between the two attaching holes 74. The second opening 76 is fan-shaped and formed at a position where the center of the brake disc 70 is positioned and the second opening 76 overlaps middle protruding tube 41b or the like in the rear view. The second opening 76 is formed in an area surrounded by the support portion 71, connection portion 72, and contact portion 73.

The first opening 75 and the second opening 76 are formed for the purpose of improving the installation operation of the lean brake mechanism 50 or the like. In the following, the installation operation of the lean brake mechanism 50 shown in FIG. 3 and FIG. 6 will be described and the purpose of forming the first opening 75 and the second opening 76. The order of the installation operation is an example, other order that is different from this embodiment may be used.

First, the brake disc 70 is attached to the lower arm 44 by using the fixture 91. Next, the lean bracket 80 is attached to the upper fulcrum portion 43a, middle protruding tube 41b, and the lower fulcrum portion 44a via the fixture 92, 93, 94. Here, in the rear view, the fixture 92, 93 overlap the second opening 76, and the fixture 94 overlaps the first opening 75. Thus, workability of the operation of inserting the fixture 92, 93, 94 is high by being formed the first opening 75 and the second opening 76.

The base attaching portion 81 is positioned at forward (closer to the lean base 41) than the brake disc 70, whereas the caliper attaching portion 83 is positioned rearward (farther from lean base 41) than the brake disc 70. Furthermore, in the rear view, the brake disc 70 and the lean bracket 80 are positioned so that they overlap. Thus, if the second opening 76 is not formed, the brake disc 70 and the lean bracket 80 interferes with each other. However, in this embodiment, a second opening 76 is formed, and the relay portion 82 passes through the second opening 76 is penetrated in the axial direction. This allows the lean bracket 80 to be positioned on the front and rear side of the brake disc 70. Thus, since the brake caliper 60, the brake disc 70, and lean bracket 80 are intensively disposed, the lean brake mechanism 50 can be compact.

In the rear view, the first attaching portion 87 and the fixture 95 are positioned radially inside of the contact portion 73, and the second attaching portion 88 and the fixture 96 are positioned radially outside of the contact portion 73. Thus, since a attaching positions of the brake caliper 60 and the lean bracket 80 can be separated, the brake caliper 60 can be stably attached to the lean bracket 80.

The shape of the first opening 75 is not limited to circular, as long as the fixture 94 can be attached. The shape of the second opening 76 is not limited to fan shape, as long as the fixture 92, 93, 94 can be attached.

As thus far described, the leaning vehicle 1 according to any of this embodiment includes the vehicle body 2, the left front wheel 31L, the right front wheel 31R, the lean mechanism 42, and the lean brake mechanism 50. The left front wheel 31L is positioned on the first side in the vehicle width direction. The right front wheel 31R is positioned on the second side opposite to the first side in the vehicle width direction. The lean mechanism 42 causes the left front wheel 31L and the right front wheel 31R to lean about the front-rear direction as a rotation center when the vehicle body 2 leans about the front-rear direction as a rotation center. The lean brake mechanism 50 brakes the leaning operation of the lean mechanism 42. The lean mechanism 42 includes the upper arm 43, the lower arm 44, the left arm 45, the right arm 46, and the lean base 41. The lower arm 44 is positioned more downward than the upper arm 43. The left arm 45 is attached to the left front wheel 31L, and is rotatably attached to the upper arm 43 and the lower arm 44. The right arm 46 is attached to the right front wheel 31R, and is rotatably attached to the upper arm 43 and the lower arm 44. The lean base 41 connects the upper arm 43 and the lower arm 44 to the vehicle body 2. The lean brake mechanism 50 includes the brake caliper 60 and the brake disc 70. The brake caliper 60 is attached to the lean mechanism 42 and has the brake pad 65. The brake disc 70 is attached to one arm of the upper arm 43 and the lower arm 44 that is farther from the brake pad 65 in the front view, has the contact portion 73 that generates braking force by being pressed by the brake pad 65.

Accordingly, by attaching the brake disc 70 to one arm that is farther from the brake pad 65 (the lower arm 44), the rotation radius of the lean brake mechanism 50 can be large and thus the braking force can be large. As the lean brake mechanism 50 is attached to the lean mechanism 42, the lean brake mechanism 50 can be compact. The above allows for a compact configuration while increasing the braking force of the lean brake.

In the leaning vehicle 1 of this embodiment, the contact portion 73 overlaps the arm (the upper arm 43) that is an arm closer to the brake pad 65 in the front view or the rear view.

This allows the lean brake mechanism 50 to be able to be compact compared to a configuration in which the contact portion 73 is located only above the upper arm 43 or only below the lower arm 44.

In the leaning vehicle of this embodiment, when the brake disc 70 is attached to the upper arm 43, the contact portion 73 includes a portion that is lower than the lower arm 44 in the front view or the rear view. When the brake disc 70 is attached to the lower arm 44, the contact portion 73 includes a portion that is upper than the upper arm 43 in the front view or the rear view.

Accordingly, the turning radius of the lean brake mechanism 50 is large, the braking force of the lean brake can be high.

In the leaning vehicle 1 of this embodiment, the first opening 75 and the second opening 76 are formed on the brake disc 70. In the front view or the rear view, the first opening 75 and the second opening 76 overlap fixtures 92-95 that are attached to the lean mechanism 42 and the lean brake mechanism 50.

Accordingly, attachment/detachment of the fixtures or check for looseness of the fixtures can be performed in a situation where the brake disc 70 is attached to the upper arm 43 or the lower arm 44.

The leaning vehicle 1 of this embodiment includes the lean bracket 80 having the first attaching portion 87 inserted the fixture 95 for attaching the brake caliper 60 to the lean mechanism 42. In the front view or the rear view, the first opening 75 and the first attaching portion 87 overlap.

Accordingly, attachment/detachment of the brake caliper 60 or check for looseness of the fixture 95 inserted the first attaching portion 87 can be performed in a situation where the brake disc 70 is attached.

In the leaning vehicle 1 of this embodiment, the lean bracket 80 includes the caliper attaching portion 83, the base attaching portion 81, and the relay portion 82. The caliper attaching portion 83 includes the first attaching portion 87. The base attaching portion 81 attaches the lean bracket 80 to the lean base 41. The relay portion 82 passes through the second opening 76 in the axial direction and connects the base attaching portion 81 and the caliper attaching portion 83.

This allows for greater flexibility in the attaching position of the lean bracket 80 and brake caliper 60, for example.

In the leaning vehicle 1 of this embodiment, the lean bracket 80 includes the second attaching portion 88 inserted the fixture 96 for attaching the brake caliper 60 to the lean mechanism 42 outside of the brake disc 70 in the radial direction.

Accordingly, the brake caliper is attached to the lean mechanism in a stable manner.

While some preferred embodiments of the present invention have been described above, the configurations described above may be modified, for example, as follows.

In the various mechanisms described above, the shape of a component, the layout of a component, the structure for attaching a component, the structure for transmitting power, and the like, are just examples, and other configurations may be adoptable. For example, the left arm 45 does not always need to serve as a component for transmitting a steering force. A component different from the left arm 45 may serve as the component for transmitting a steering force. The lean bracket 80 has a function of coupling the upper fulcrum portion 43a and middle protruding tube 41b, a function of coupling the lower fulcrum portion 44a and the middle protruding tube 41b, and a function of attaching the brake caliper 60 to the lean mechanism 42. Instead of this configuration, each function may be realized by individual components.

Although the foregoing embodiments illustrate an example in which the present invention is applied to the leaning vehicle 1 having two front wheels and one rear wheel, the number of wheels is not limited to this. Two rear wheels may be acceptable. In addition, the number of persons who can ride on the leaning vehicle 1 is not limited to one or two. Three or more persons may ride.

REFERENCE SIGNS LIST 1 leaning vehicle
2 vehicle body
31L left front wheel (first front wheel)
31R right front wheel (second front wheel)
32L left wheel
32R right wheel
42 lean mechanism
50 lean brake mechanism
60 brake caliper
70 brake disc
80 lean bracket

The invention claimed is:
1. A leaning vehicle, comprising:
a vehicle body;

a first front wheel positioned on a first side in a vehicle width direction;

a second front wheel positioned on a second side opposite to the first side in the vehicle width direction;

a lean mechanism configured to cause the first front wheel and the second front wheel to lean about a front-rear direction as a rotation center when the vehicle body leans about the front -rear direction as the rotation center; and a lean brake mechanism configured to brake a leaning operation of the lean mechanism, wherein the lean mechanism includes:
   an upper arm,
   a lower arm positioned more downward than the upper arm,
   a first arm attached to the first front wheel and is rotatably attached to the upper arm and the lower arm,
   a second arm attached to the second front wheel and rotatably attached to the upper arm and the lower arm, and
   a lean base connecting the upper arm and the lower arm to the vehicle body, wherein the lean brake mechanism includes:
   a brake caliper attached to the lean mechanism and has a brake pad, and
   a brake disc attached to one arm of the upper arm and the lower arm which is farther from the brake pad in a front view, having a contact portion that generates braking force by being pressed by the brake pad, wherein if the upper arm is attached to the brake disc, the upper arm includes a first fulcrum portion at a longitudinal center of the upper arm, the first fulcrum portion being rotatably attached to a side body portion of the vehicle body, wherein if the lower arm is attached to the brake disc, the lower arm includes a second fulcrum portion at a longitudinal center of the lower arm, the second fulcrum portion being rotatably attached to the side body portion of the vehicle body, and wherein, in a side view, the first and second front wheels overlap with the lean mechanism.

2. The leaning vehicle according to claim 1, wherein the contact portion overlaps the other arm that is an arm closer to the brake pad in the front view or a rear view.

3. The leaning vehicle according to claim 1, wherein when the brake disc is attached to the upper arm, the contact portion includes a portion that is lower than the lower arm in the front view or a rear view, and wherein when the brake disc is attached to the lower arm, the contact portion includes a portion that is upper than the upper arm in the front view or the rear view.

4. The leaning vehicle according to claim 1, wherein an opening is formed on the brake disc, and wherein in the front view or a rear view, the opening overlaps at least fixture that is attached to the lean mechanism and the lean brake mechanism.

5. The leaning vehicle according to claim 4, further comprising:
   a lean bracket having a first attaching portion inserted the fixture for attaching the brake caliper to the lean mechanism,
   wherein in the front view or the rear view, the opening and the first attaching portion overlap.

6. The leaning vehicle according to claim 5, wherein the lean bracket includes:
   a caliper attaching portion including the first attaching portion;
   a base attaching portion attaching the lean bracket to the lean base; and
   a relay portion passing through the opening and connects the base attaching portion and the caliper attaching portion.

7. The leaning vehicle according to claim 5, wherein the lean bracket includes a second attaching portion inserted into the fixture configured to attach the brake caliper to the lean mechanism outside of the brake disc in a radial direction.

8. The leaning vehicle according to claim 1, wherein the upper arm is positioned at a higher position than an axle of the first and second front wheels and the lower arm is positioned at a lower position than the axle of the first and second front wheels.

9. The leaning vehicle according to claim 1, wherein each of the first and second arms includes a knuckle member and a leaning member, the knuckle member changing an actual steering angle, the leaning member leaning the leaning vehicle, the knuckle member and the leaning member being unified, wherein an upper end portion of the first arm and an upper end portion of the second arm are attached to the upper arm, and wherein a lower end portion of the first arm and a lower end portion of the second arm are attached to the lower arm.

* * * * *